C. T. MASON.
IGNITION DYNAMO.
APPLICATION FILED JULY 28, 1913.
1,133,990.
Patented Mar. 30, 1915.
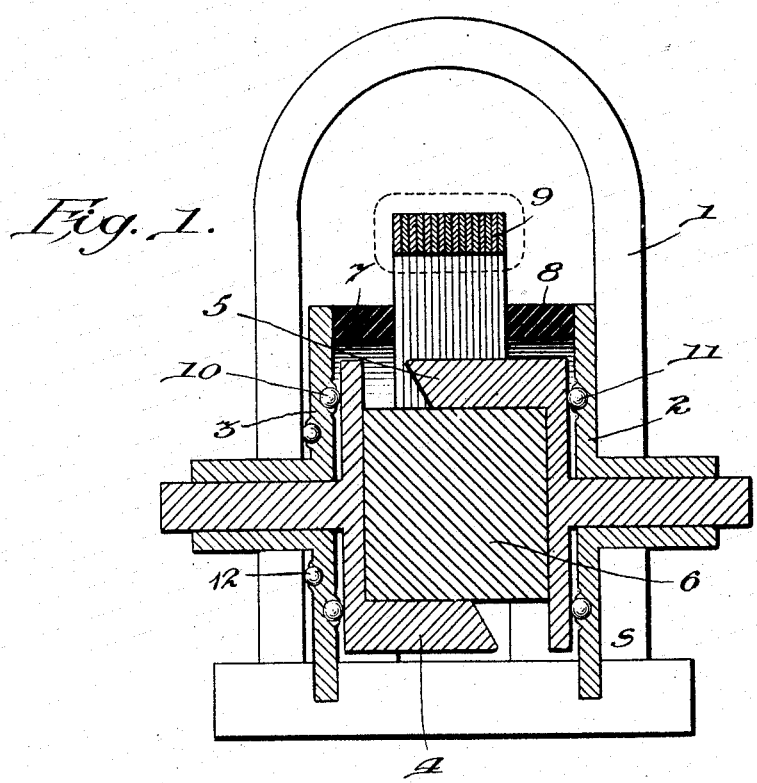
Fig. 1.
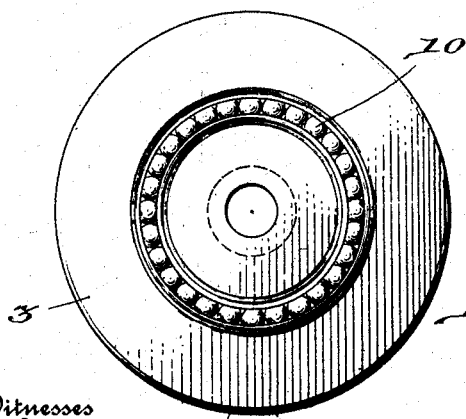
Fig. 2.
Fig. 3.
Witnesses
H. Löwenstein
James H. Marr
Inventor
Charles T. Mason
By H. R. VanDeventer
Attorney

UNITED STATES PATENT OFFICE.

CHARLES THOMAS MASON, OF SUMTER, SOUTH CAROLINA, ASSIGNOR TO SUMTER ELECTRICAL COMPANY, A CORPORATION OF SOUTH CAROLINA.

IGNITION-DYNAMO.

1,133,990.      Specification of Letters Patent.      Patented Mar. 30, 1915.

Application filed July 28, 1913. Serial No. 781,698.

*To all whom it may concern:*

Be it known that I, CHARLES THOMAS MASON, a citizen of the United States, residing at Sumter, in the county of Sumter and State of South Carolina, have invented certain new and useful Improvements in Ignition-Dynamos, of which the following is a specification, reference being had to the accompanying drawing.

My invention relates to ignition dynamos and particularly to those of the magneto type, and consists of improvements in the construction of the moving element of machines embodying the principle disclosed in my Letters Patent for ignition dynamos, patented Dec. 16, 1913, No. 1,081,760.

The objects of my invention are; to provide a machine in which end friction of the rotating element is reduced to a minimum; to combine with said friction reducing means, means for providing an efficient path for the magnetic flux between the magnet and the rotating element, whereby the loss due to the usual air gaps is eliminated; to provide means whereby the magnetic "stick" or pull endwise on the rotor is prevented from affecting the movement of said rotor; and to provide a machine of increased electrical efficiency, easily assembled, of few parts, and simple construction.

Figure 1 is a sectional longitudinal view of a magneto showing my invention, Fig. 2 a sectional view on an enlarged scale of the left-hand ball bearings shown in Fig. 1, and Fig. 3, a view of the inside surface of one end plate. The same figures of reference denote the same parts wherever they are shown.

1 denotes a permanent magnet in which are positioned the end plates 2 and 3 of the armature structure. In these plates are bearings for the shafts of the rotating element or rotor formed of the magnetic pieces 4 and 5 joined together by the non-magnetic block 6.

The end plates 2 and 3 carry the non-magnetic rings 7 and 8 which support the core 9 of the armature structure, this core carrying a suitable winding, not shown.

By this construction the following operation is made possible: The rotor elements 4 and 5 in turning carry the flux unchanged from the two poles of the permanent magnet 1 to the opposite poles of the core 9 alternately. To adjust the point or time at which the peak of the generated E. M. F. will be produced, the pole pieces of the core 9 are turned about the axis of the rotor by turning the entire structure consisting of the core 9, the rings 7 and 8 and the end plates 2 and 3, the latter of course having bearings in the magnet poles for their extension sleeves or collars, through which the shaft ends of the rotor elements pass.

It is evident that the rotating elements 4 and 5 are permanently of the same polarity as the respective magnet poles adjacent to them, but may have a tendency to stick against the end plate 2 or 3 interposed between them and the magnet 1, thus making the machine inclined to hard or jerky action, unless the parts are made a comparatively loose fit, which is objectionable because of loss of efficiency. To eliminate this, I place in each end plate a row of balls as indicated at 10 and 11, so that the lateral surfaces of the rotating element and the adjacent end plate are not in direct frictional contact over a large surface. This eliminates the sticking referred to, and also serves to eliminate much of the usual mechanical friction present if the adjacent lateral surfaces touch each other.

It is obvious that a certain amount of lubrication is necessary between the surface of the rotating elements and the end plates against which they bear, and the introduction of any lubricant necessarily forms a gap or separation in the magnetic circuit. It is also obvious that this magnetic circuit should be as perfect as possible between the rotating element and the magnet pole, and if the balls referred to are made from steel, which is the usual practice, they form a good path for the magnetic flux, thereby eliminating the weakening effect which occurs when the balls are not used.

By the above construction I am enabled to obtain a freely movable rotor, and yet obtain the highest efficiency, all actual air gaps and loose fits between the rotor and its magnet being eliminated.

In certain types of dynamos it is necessary to have the armature structure movable. A machine of this type is described in my co-pending application No. 696,487, filed May 10th, 1912. When this is the case, to preserve the continuity of the magnetic circuit, balls may be placed on both sides of the end plates as shown in Figs. 1 and 2, 12 indicating the additional or outside set of balls which are placed between the inner surface of the magnet 1, and the end plates 2 or 3. The inside set of balls indicated at 10, is placed between 3 and the rotor 4, as previously described. By this means not only is friction reduced in the rotor as hereinbefore described, but the entire armature structure is freely movable within the magnet without introducing any air gaps in the magnetic circuit.

Although ball bearings may be used, it will be observed that the balls are not used as bearings, as they do not support or carry the various parts. While in a measure they do obviate end thrust, this thrust is due to magnetism—and is not end thrust in the mechanical sense in which the term is usually used. I therefore consider by employment of balls, as shown, to be new in connection with ignition magnetos of this type, and it is obvious that the arrangement and location of the balls for accomplishing this result may be varied without departing from my invention. I also deem the method of using balls of magnetic material for forming a path for the magnetic flux between the various parts of this type of machine, to be new. It is obvious however that other forms than spheres—such as small rollers—could be used.

Having thus described my invention, what I claim and desire to secure by Letters Patent is—

1. In a dynamo, a magnet, end plates adjacent the polar extremities of said magnet, bearings for said end plates, friction reducing magnetic flux conducting means interposed between the adjacent lateral surfaces of said magnet and end plates, a rotor, bearings in said end plates for said rotor, and friction reducing magnetic flux conducting means interposed between the adjacent lateral surfaces of said rotor and end plates.

2. In a dynamo, a magnet, a rotor journaled axially between the poles of said magnet, end plates movable about the axis of the rotor, which is also their own axis, said end plates interposed between the ends of the rotor and the opposed cheeks of the magnet poles, and friction reducing magnetically conducting bearing means between said end plates and the said cheeks of the magnet poles, together with an armature coil supported from said end plates.

In testimony whereof I hereunto affix my signature in the presence of two witnesses.

CHARLES THOMAS MASON.

Witnesses:
F. C. MANNING,
H. R. VAN DEVENTER.